United States Patent
Camomile et al.

(10) Patent No.: US 11,873,133 B2
(45) Date of Patent: Jan. 16, 2024

(54) BOTTLE, INJECTION BLOW MOLDING CORE ROD FOR THE BOTTLE AND RELATED METHOD

(71) Applicant: Drug Plastics & Glass Company, Inc., Boyertown, PA (US)

(72) Inventors: Douglas S. Camomile, Boyertown, PA (US); Norris W. Matthews, Jr., Boyertown, PA (US); David R. Thomson, Boyertown, PA (US); Nickolaus A. Furman, Boyertown, PA (US); Kyle A. Moll, Boyertown, PA (US)

(73) Assignee: DRUG PLASTICS & GLASS COMPANY, INC., Boyertown, PA (US)

( * ) Notice: Subject to any disclaimer, the term of this patent is extended or adjusted under 35 U.S.C. 154(b) by 0 days.

(21) Appl. No.: 17/725,385

(22) Filed: Apr. 20, 2022

(65) Prior Publication Data

US 2022/0332459 A1   Oct. 20, 2022

Related U.S. Application Data

(60) Provisional application No. 63/177,105, filed on Apr. 20, 2021.

(51) Int. Cl.
*B65D 1/02* (2006.01)
*B29C 49/06* (2006.01)
*B29C 49/12* (2006.01)
*B29C 49/76* (2006.01)
(Continued)

(52) U.S. Cl.
CPC ............ *B65D 1/0246* (2013.01); *B29C 49/06* (2013.01); *B29C 49/121* (2022.05); *B29C 49/425* (2022.05); *B29C 49/761* (2022.05); *B29L 2031/7158* (2013.01)

(58) Field of Classification Search
CPC ...... B65D 1/0246; B65D 1/023; B65D 41/04; B65D 41/00; B65D 41/06; B29L 2031/716; B29L 2031/7158; B29C 49/761; B29C 49/121; B29C 49/425; B29C 49/06
USPC ...... 215/44, 43, 40, 329, 316; 220/601, 293, 220/288
See application file for complete search history.

(56) References Cited

U.S. PATENT DOCUMENTS 4,948,001 A * 8/1990 Magly .................. B29C 33/005
                                                    220/296
5,197,602 A * 3/1993 Biesecker .......... B65D 77/0493
                                                    206/499
5,318,183 A   6/1994 Cohen et al.
(Continued)

FOREIGN PATENT DOCUMENTS

CA        2664050 A1 * 11/2009 ........... B65D 1/0246
WO   WO-2005118407 A2 * 12/2005 ......... B29C 49/0005

*Primary Examiner* — Robert J Hicks
(74) *Attorney, Agent, or Firm* — Panitch Schwarze Belisario & Nadel LLP

(57) ABSTRACT

A bottle for containing an item, generally a pharmaceutical product, wherein the bottle includes a body having a bottom wall and sidewalls, a neck extending from a top portion of the sidewalls and a thread defined on the neck. The neck defining a mouth of the bottle, an internal surface and an external surface. A neck thickness is defined between the internal surface and the external surface. The thread defines a thread thickness. The thread thickness is substantially the same as the neck thickness.

12 Claims, 1 Drawing Sheet

(51) Int. Cl.
   *B29C 49/42*    (2006.01)
   *B29L 31/00*    (2006.01)

(56) References Cited

U.S. PATENT DOCUMENTS

| | | |
|---|---|---|
| 5,626,262 A | 5/1997 | Fitten et al. |
| 5,655,687 A | 8/1997 | Fitten et al. |
| 6,243,936 B1 | 6/2001 | Biesecker et al. |
| D603,265 S | 11/2009 | Biesecker |
| D611,344 S | 3/2010 | Longacre |
| 9,981,789 B2 | 5/2018 | Koller et al. |
| D871,218 S | 12/2019 | Biesecker, II et al. |
| 2003/0136753 A1 | 7/2003 | Biesecker et al. |
| 2005/0139569 A1* | 6/2005 | Larsen .................. B29C 49/76 |
| | | 264/318 |
| 2007/0045320 A1 | 3/2007 | Biesecker et al. |
| 2009/0266736 A1 | 10/2009 | Sprishen et al. |
| 2011/0017741 A1 | 1/2011 | Sprishen |
| 2015/0321804 A1 | 11/2015 | Koller et al. |
| 2020/0339320 A1 | 10/2020 | Biesecker, II et al. |

\* cited by examiner

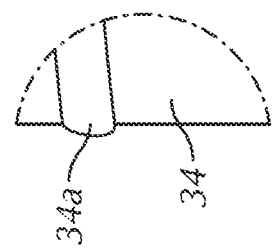
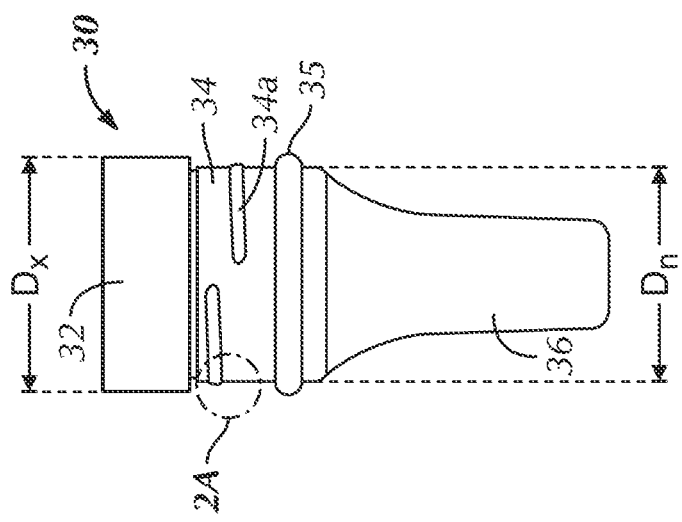
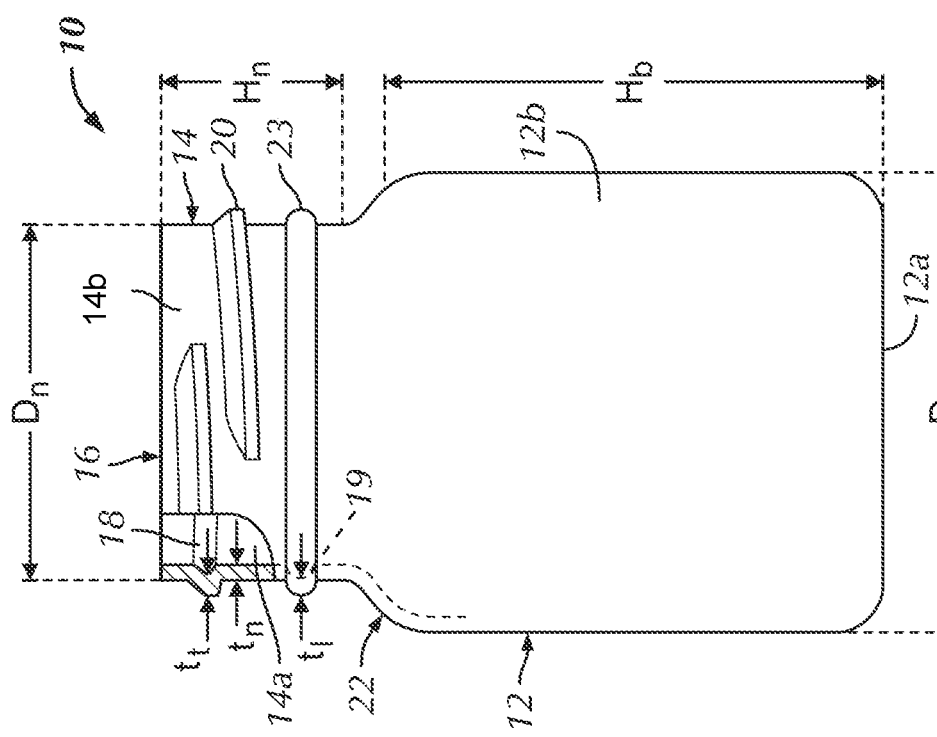

BOTTLE, INJECTION BLOW MOLDING CORE ROD FOR THE BOTTLE AND RELATED METHOD

CROSS-REFERENCE TO RELATED APPLICATIONS

The present application claims the benefit of U.S. Provisional Patent Application No. 63/177,105, filed Apr. 20, 2021 and titled, "Bottle, Injection Blow Molding Core Rod for the Bottle and Related Method," the entire contents of which is incorporated herein by reference in its entirety.

BACKGROUND OF THE INVENTION

Injection blow molding ("IBM") is a polymeric molding technique typically utilized to manufacture small medical, pharmaceutical, cosmetic, and other single serve bottles. The IBM process forms the bottles with the body and neck in a single process, such that the body and neck are integrally formed. The IBM process typically involves injection molding a preform onto a core pin, opening an initial mold while the polymeric injected material is still hot, placing a larger mold over the preform, inflating the preform into a desired final shape, cooling the shaped product and removing the product from the core rod. The IBM process is designed for mass production of thousands, hundreds of thousands or more products. Small medical and pharmaceutical bottles are often manufactured using the IBM process. Efficiency in the process is desirable and the cooling process can be a limiting factor. The bottles formed by the IBM process often have variable thicknesses in their final form, such as having a greater thickness at threads in the neck of the bottle. The bottle necks have a smooth internal cylindrical surface while the threads extend radially outwardly from an outside surface of the neck such that the thickness of the bottles in the area of the threads is greater than other sections of the bottle. The thicker threads require additional cooling time because the central portion of the threads require additional time for cooling. It would be desirable to design, implement and deploy a bottle, IBM molding equipment and method that reduces the cooling cycle to reduce cycle times for the production of each final bottle.

BRIEF SUMMARY OF THE INVENTION

Briefly stated, the preferred invention is directed to a bottle for containing an item, generally a pharmaceutical product, wherein the bottle includes a body having a bottom wall and sidewalls, a neck extending from a top portion of the sidewalls and a thread defined on the neck. The neck defining a mouth of the bottle, an internal surface and an external surface. A neck thickness is defined between the internal surface and the external surface. The thread defines a thread thickness. The thread thickness is substantially the same as the neck thickness. In the preferred embodiment, the thread thickness and neck thickness are not necessarily identical, but are substantially the same, thereby resulting in substantially the same thread and neck thicknesses that generally cure at a similar rate and time and resulting in an internal groove on the neck that facilitates protrusion of the threads from the outer surface of the neck while maintaining substantially the same thread and neck thickness.

In another aspect, the preferred invention is directed to an injection blow molding core rod assembly for manufacturing a bottle having a core rod base, a neck forming section connected to the core rod base, and a core rod tip connected to the neck forming section. The neck forming section having outwardly extending thread forms. The neck forming section positioned between the core rod base and the core rod tip.

BRIEF DESCRIPTION OF THE SEVERAL VIEWS OF THE DRAWINGS

The foregoing summary, as well as the following detailed description of a preferred embodiment of the bottle, injection blow molding core rod for the bottle and related method of the present device, system and method, will be better understood when read in conjunction with the appended drawings. For the purposes of illustrating the preferred bottle, injection blow molding core rod for the bottle and related method, there is shown in the drawings a preferred embodiment of the present invention. It should be understood, however, that the application is not limited to the precise arrangements and instrumentalities shown. In the drawings:

FIG. 1 illustrates a front elevational, partial cross-sectional view of a bottle in accordance with a preferred embodiment of the present invention;

FIG. 2 illustrates a front elevational view of a core rod in accordance with a preferred embodiment of the present invention used in a manufacturing method to construct the bottle of FIG. 1; and FIG. 2A illustrates a magnified front elevational view of a portion of the core rod of FIG. 2, taken from within circle 2A of FIG. 2.

DETAILED DESCRIPTION OF THE INVENTION

Certain terminology is used in the following description for convenience only and is not limiting. Unless specifically set forth herein, the terms "a," "an," and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center of the preferred bottle, injection blow molding core rod for manufacturing the bottle and related parts thereof. The terminology includes the above-listed words, derivatives thereof and words of similar import.

It should also be understood that the terms "about," "approximately," "generally," "substantially" and like terms, used herein when referring to a dimension or characteristic of a component of the preferred invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles are accepted in the art (e.g., rounding, measurement or other systematic errors, manufacturing tolerances, etc.).

Referring to FIGS. 1-2A, a preferred embodiment of the present invention is directed to a bottle, generally designated 10, for containing an item, such as a pharmaceutical product. The bottle 10 includes a body 12 having a bottom wall 12a and sidewalls 12b and a neck 14 extending from a top portion of the sidewalls 12b. The neck 14 defines a mouth 16 of the bottle 10 that opens into a storage cavity inside the body 12. The neck 14 includes an internal surface 14a and an external surface 14b. The bottle 10 also includes a thread 20 defined on the neck 14. The thread 20 is associated with or are releasably engageable with internal threads on a cap (not shown). The cap is selectively mountable to the neck 14 of the bottle 20 using the threads 20 to alternately close and open the storage cavity.

In the preferred embodiment, the internal surface 14a includes an internal groove 18 defined thereon. The internal groove 18 is associated with the thread 20 or is positioned on the internal surface 14a opposite or mirroring the thread 20. The internal groove 18 of the preferred embodiment has a generally helical shape, although the internal groove 18 is not so limited. The internal groove 18 may have nearly any size and shape that follows or mirrors the threads 20, as is described in greater detail below.

A neck thickness $t_n$ is defined between the internal surface 14a and the external surface 14b of the neck 14 and a thread thickness $t_t$ is defined between the internal surface 14a in the internal groove 18 and the external surface 14b at the thread 20. The neck thickness $t_n$ is substantially the same as the thread thickness $t_t$. In prior art bottles, the internal surface does not include the internal groove 18, such that a section of the neck adjacent the thread is thicker than other portions of the neck. As a result of constructing the neck 14 with substantially the same neck and thread thicknesses $t_n$, $t_t$, the neck 14 cures and cools at substantially the same rate in both the area of the threads 20 and the remainder of the neck 14. This substantially the same or equivalent neck and thread thickness $t_n$, $t_t$ requires approximately the same amount of time to cool, instead of the thicker threaded sections of the prior art necks requiring additional time to cure and cool. Processing time with the substantially equivalent neck and thread thickness $t_n$, $t_t$, is therefore realized to improve the efficiency of the manufacturing process of the preferred bottle 10.

The thread thickness $t_t$ of the preferred bottle 10 is substantially equivalent to the neck thickness $t_n$ for at least the above-described reasons. In the preferred embodiment, the thread thickness $t_t$ and the neck thickness $t_n$ define a thickness ratio comprised of the thread thickness $t_t$ divided by the neck thickness $t_n$. The thickness ratio is preferably less than two, more preferably less than or equal to one and three-quarters, one and one-half, or one and one-quarter and further preferably approximately one. The thickness ratio is not specifically limited to these indicated ratios and may include alternative ratios depending on designer preferences, thread type, bottle type, structural integrity considerations and additional design factors. As a non-limiting example, the neck thickness $t_n$ may be approximately one and twenty-two hundredths millimeters (1.22 mm) and the thread thickness $t_t$ may be approximately two and sixteen hundredths millimeters (2.16 mm), resulting in a thickness ratio of one and seventy-seven hundredths (1.77).

In the preferred embodiment, the neck 14 defines an outside neck diameter $D_n$ and the body 12 defines an outside body diameter Db. The outside body diameter Db of the preferred embodiment is greater than the outside neck diameter $D_n$, such that the storage cavity is relatively large compared to the volume within the neck 14. The neck 14 of the preferred embodiment defines a neck height $H_n$ and the body 12 defines a body height $H_b$. The body height $H_n$ is greater than the neck height $H_b$, such that the volume of the storage cavity is larger than the volume of the neck void. The body height $H_n$ is not limited to being greater than the neck height $H_b$ and the outside body diameter $D_b$ is not limited to being greater than the outside neck diameter $D_n$, but the bottle 10 is typically configured in this manner to maximize storage volume and limit the size of the mouth 16 of the bottle 10 to retain the contents of the bottle 10, which may be comprised of a pharmaceutical product. The neck height $H_b$ may, however, be greater than the body height $H_n$ and the outside neck diameter $D_n$ may be greater than the outside body diameter $D_b$ without significantly impacting the performance and use of the preferred bottle 10.

The thread thickness $t_t$ and the neck thickness $t_n$ of the preferred bottle 10 are approximately one to three millimeters (1-3 mm) but are not so limited and may be smaller or larger depending on designer preferences, expected loading, application preferences and other factors related to the preferred bottle 10. The thread thickness $t_t$ and the neck thickness $t_n$ may have nearly any dimension as long as the dimension permits functioning of the preferred bottle for its desired application, is able to withstand the normal operating conditions of bottle 10 and take on the preferred size and shape of the bottle 10.

The threads 20 of the preferred bottle 10 are comprised of a modified buttress shape but are not so limited. The threads 20 may take on nearly any thread type or shape that is able to be formed on the neck 14, carry the loads of the bottle 10, releasably attach the cap to the neck 14 and withstand the normal operating conditions of the bottle 10. The threads 20 may be comprised of alternative types, such as sharp V, unified, Whitworth, modified square, square, ACME, B&S Worm, knuckle, Dardelet and related types of threads 20. Each of these threads 20 are preferably designed and configured such that the internal groove 18 is formed in association with the threads 20 such that the thread thickness $t_t$ is substantially the same as the neck thickness $t_n$.

The preferred bottle 10 also includes a bead or support ledge 23 positioned on the neck 14 or between the neck 14 and the body 12 and a bottle shoulder 22 positioned between the bead or support ledge 23 and the body 12. The bead or support ledge 20 and the shoulder provides a transition between the neck 14 and the body 12. The bead or support ledge 23 preferably includes an internal ledge groove 19 similar to the internal groove 18 of the threads 20, thereby resulting in a relatively consistent thickness of the neck 14 at the bead or support ledge 23. The internal ledge groove 19 preferably has a cylindrical shape that mirrors or follows the shape and size of the support ledge 23. The internal ledge groove 19 of the support ledge 23 facilitates relatively even and consistent curing of the bottle 10 near the bead or support ledge 23. The support ledge 23 is not limited to inclusion of the internal ledge groove 19 and the internal surface 14a may be substantially continuous adjacent the support ledge 23 without the internal ledge groove 19 at the internal surface 14a adjacent the support ledge 23 without significantly impacting the manufacturing or function of the bottle 10. The bottle 10 is not limited to inclusion of the bottle shoulder 22 and the bead or support ledge 23 and may be constructed without the bottle shoulder 22 and the bead or support ledge 23 without significantly impacting the design, configuration and operation of the bottle 10.

A ledge thickness $t_l$ is defined between the internal surface 14a in the internal ledge groove 19 and the external surface 14b at the support ledge 23. The neck thickness $t_n$ is substantially the same as the ledge thickness $t_l$. As a result of constructing the neck 14 with substantially the same neck and ledge thicknesses $t_n$, $t_l$, the neck 14 cures and cools at substantially the same rate in both the area of the support ledge 23 and the remainder of the neck 14. This substantially the same or equivalent neck and ledge thickness $t_n$, $t_l$ requires approximately the same amount of time to cool, instead of the thicker threaded sections and support ledge sections of the prior art necks requiring additional time to cure and cool. Processing time with the substantially equivalent neck and ledge thickness $t_n$, $t_l$, is therefore realized to improve the efficiency of the manufacturing process of the preferred bottle 10.

The ledge thickness $t_l$ of the preferred bottle 10 is substantially equivalent to the neck thickness $t_n$ for at least the above-described reasons. In the preferred embodiment, the ledge thickness $t_l$ and the neck thickness $t_n$ define a ledge thickness ratio comprised of the ledge thickness $t_l$ divided by the neck thickness $t_n$. The ledge thickness ratio is preferably less than two, more preferably less than or equal to one and three-quarters, one and one-half, or one and one-quarter and further preferably approximately one. The neck, thread and ledge thicknesses $t_n$, $t_t$, $t_l$ are each substantially the same or equivalent, as described herein, such that the areas of the neck 14 require approximately the same amount of time to cool, instead of the thicker threaded sections and support ledge sections of the prior art necks requiring additional time to cure and cool. The ledge thickness ratio is not specifically limited to these indicated ratios and may include alternative ratios depending on designer preferences, ledge type, bottle type, structural integrity considerations and additional design factors. Processing time with the substantially equivalent neck, thread and ledge thickness $t_n$, $t_t$, $t_l$, is therefore realized to improve the efficiency of the manufacturing process of the preferred bottle 10.

The bottle 10 of the preferred embodiment is constructed utilizing IBM with an injection blow molding core rod assembly 30, although the system is not limited to blow molding and may be comprised of other forms of injection molding. The injection blow molding core rod assembly 30 includes a core rod base 32, a neck forming section 34 connected to the core rod base 32 and a core rod tip 36 connected to the neck forming section 34. The neck forming section 34 has outwardly extending thread forms 34a that extend radially outwardly from the neck forming section 34. The neck forming section 34 is positioned between the core rod base 32 and the core rod tip 36 such that the neck forming section 34 forms and defines the threads 20 of the preferred bottle 10 with the internal groove 18 to facilitate relatively rapid cooling and manufacture of the bottle 10. The neck forming section 34 also preferably includes a raised ring 35 that defines the internal ledge groove 19, which is associated with the support ledge 23. The raised ring 35 has a generally cylindrical shape and forms the internal ledge groove 19 that also has a relatively cylindrical shape on the neck 14. The bottle 10 is not limited to including the raised ring 35 and the internal ledge groove 19 and may be designed and configured without the raised ring 35, may include the raised ring 35 without the internal ledge groove 19 or may be otherwise designed and configured with differently shaped and sized raised rings 35 and internal ledge grooves 19 without significantly impacting the operation and function of the bottle 10.

The outwardly extending thread forms 34a have a generally helical shape in the preferred embodiment but are not so limited and may have alternative shapes depending on the desired threads 20 that are formed on the neck 14. The neck forming section 34 preferably defines the internal neck diameter $D_n$, as well as the internal grooves 18 on the neck 14. The outwardly extending thread forms 34a extend outwardly relative to the internal neck diameter $D_n$ to define the threads 20. The core rod base 32 of the preferred embodiment defines a base diameter $D_x$. The base diameter $D_x$ is preferably greater than the internal neck diameter $D_n$. The core rod tip 36 may taper from a proximal end that is attached to the neck forming section 34 toward a distal end but is not so limited and may not include a taper or may include alternative shapes based on designer preferences and specific alternative designs. The core rod tip 36 is not necessarily a separate component from the neck forming section 34 and may be integrally formed with the neck forming section 34 or alternatively, may be split into separate components that are engaged together.

Referring to FIGS. 2 and 2A, a partial view of the core rod assembly 30 is shown that is used in the IBM process of the preferred embodiment. In FIG. 2A, the profile with the outwardly extending thread forms 34a are added to define the internal groove 18. The thread forms 34a are machined on the core rod assemblies 30 in the preferred helical pattern and are positioned to be inside the area or adjacent to the threads 20 that are formed on the external surface 14b of the blown bottle 10.

Referring to FIG. 1, the finished molded bottle 10 is shown with the internal grooves 18 and the threads 20. The groove 18 on the internal surface 14a of the neck 14 is created by this newly designed outwardly extending thread form 34a on the core rod assembly 30. The groove 18 substantially defines a female thread form defined on the internal surface 14a of the neck 14 and the female thread form coincides with the male threads 20 formed on the external surface 14b of the neck 14. The external mold portion on the neck forming section 34 of the preferred core rod assembly 30 forms the internal groove 18 of the bottle 10 during the injection blow molding process.

A benefit of using the preferred core rod assembly 30 to mold the bottles 10 is that it results in the wall thickness, including the neck thickness $t_n$ and the thread thickness $t_t$ of the bottle 10, to be more uniform throughout the length or height of the neck 14. In prior art bottles, a thicker amount of plastic material is defined at the thread on the bottle between the external surface of the threads and the internal surface of the neck. Because cycle time is directly related to the thickness of the plastic that you are trying to mold, this new design of the preferred bottle 10 and the core rod assembly 30 allow a decrease in cycle times that are necessary to manufacture the preferred bottles 10.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present description.

We claim:

1. A bottle for containing an item, the bottle comprising:
a body having a bottom wall and sidewalls;
a neck extending from a top portion of the sidewalls, the neck defining a mouth of the bottle, an internal surface and an external surface, a neck thickness defined between the internal surface and the external surface; and
a thread defined on the neck, the thread defining a thread thickness, the thread thickness being substantially the same as the neck thickness, the thread associated with an internal groove positioned on the internal surface, the neck and thread configured to be formed by an injection blow molding core rod assembly in an injection blow molding process, wherein the groove is formed by outwardly extending thread forms on a neck forming section of the injection blow molding core rod assembly.

2. The bottle of claim 1, wherein the internal groove has a helical shape.

3. The bottle of claim 1, wherein the neck thickness and the thread thickness are approximately one to three millimeters (1-3 mm).

4. The bottle of claim 1, wherein the thread has a modified buttress shape.

5. The bottle of claim 1, wherein the neck defines an outside neck diameter and the body defines an outside body diameter, the outside body diameter being greater than the outside neck diameter.

6. The bottle of claim 1, wherein the neck defines a neck height and the body defines a body height, the body height being greater than the neck height.

7. The bottle of claim 1, further comprising:
   a support ledge positioned between the neck and the body; and
   a bottle shoulder positioned between the support ledge and the body.

8. The bottle of claim 1, wherein the thread thickness and the neck thickness define a thickness ratio, the thickness ratio is less than two.

9. The bottle of claim 1, further comprising:
   a support ledge defined on the neck, the support ledge defining a ledge thickness, the ledge thickness being substantially the same as the neck thickness.

10. The bottle of claim 9, wherein the ledge thickness and the neck thickness define a ledge thickness ratio, the ledge thickness ratio being less than two.

11. The bottle of claim 9, wherein an internal ledge groove is defined on the internal surface of the neck, the internal ledge groove associated with the support ledge, the internal ledge groove formed by a raised ring on the neck forming section of the injection blow molding core rod assembly.

12. The bottle of claim 11, wherein the internal ledge groove has a cylindrical shape.

\* \* \* \* \*